Aug. 18, 1925.
A. JORDAHL
DUST SEPARATOR
Filed March 6, 1923
1,550,366
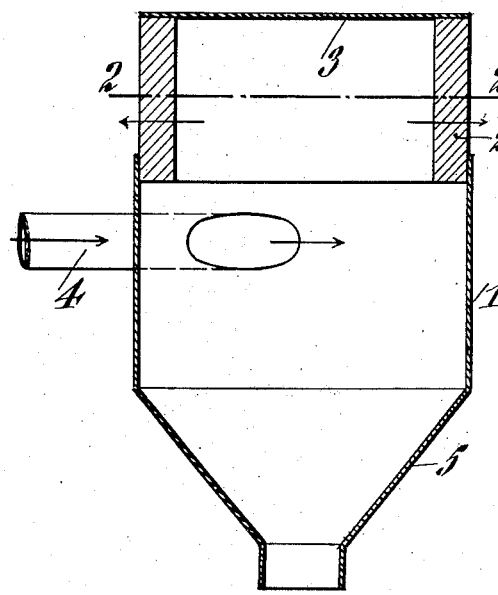
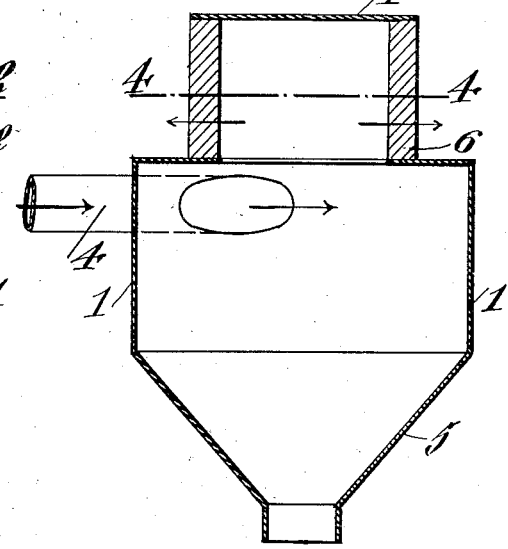
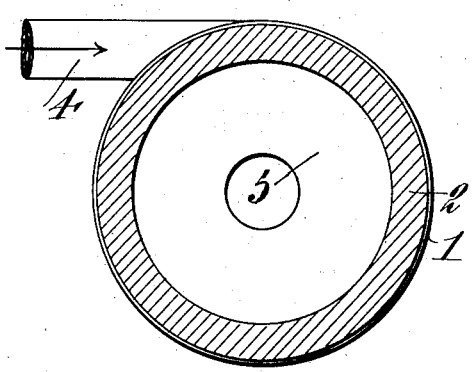
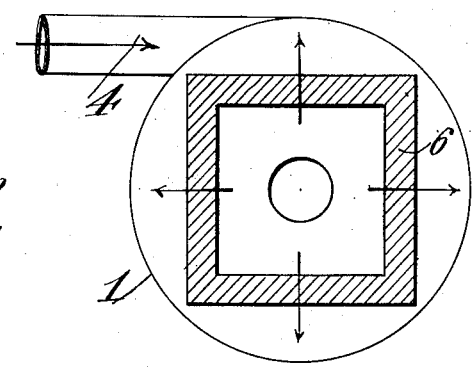
INVENTOR
Anders Jordahl
BY C. P. Goepel
ATTORNEY Patented Aug. 18, 1925.

1,550,366

UNITED STATES PATENT OFFICE.

ANDERS JORDAHL, OF NEW YORK, N. Y.

DUST SEPARATOR.

Application filed March 6, 1923. Serial No. 623,112.

*To all whom it may concern:*

Be it known that I, ANDERS JORDAHL, a subject of the King of Norway, and resident of New York, in the county and State of New York, have invented certain new and useful Improvements in Dust Separators, of which the following is a specification.

This invention relates to dust separators, and is designed to extract dust, dirt, and grit, etc. from air and gases used for the cooling or operation of machinery, or for ventilation purposes, to clean air and gases to prevent them from becoming a nuisance to the neighborhood. The separator may be used also to reclaim valuable materials in dust form contained in such air or gases, etc.

The invention has for one of its objects to provide a device simple in construction, positive and effective in operation, durable in use, and adapted to be readily installed and to occupy a minimum amount of space.

A further object of the invention is to provide a semi-automatic dust separator adapted to thoroughly cleanse a maximum amount of air and gas having high dust content in a minimum amount of time.

With the foregoing and other objects in view, hereinafter stated, the invention consists of the devices hereinafter described, and illustrated in the accompanying drawings, which show preferred embodiments of the invention, but it is to be understood that alterations and modifications thereof embodying the same principle of operation, and producing the same results, may be used without departing from the invention.

In the accompanying drawings, in which similar reference numerals indicate corresponding parts throughout the several views:

Figure 1 is a vertical transverse section of a device embodying the invention showing a filtering body of hollow cylindrical form arranged at the upper end of a casing and forming the outside wall of the upper portion thereof.

Figure 2 is a horizontal section taken on the line 2—2 of Figure 1.

Figure 3 is a central vertical section of a device embodying the invention showing a filtering body arranged in the form of a hollow prism disposed in the upper part of the casing and forming the outside wall of the upper portion.

Figure 4 is a horizontal section taken on the line 4—4 of Figure 3.

As illustrated in the drawings, the separator is provided with an outer casing 1 of any suitable construction, preferably cylindrical in outline, a tubular filter body 2 arranged at the top of the casing so as to form the outer wall thereof, with a top 3 forming a closure for the casing. In such construction the unfiltered air enters in through the inlet connection 4 into the interior of the casing, from where it passes outward through the cylindrical wall 8 of the filtering body.

Where the filter body does not extend from the top to the bottom of the casing, it is preferable to make the lower portion of the casing conical, as shown at 5, the lower portion of which may be provided with a suitable dust discharge gate.

When the filter body is arranged at the upper end of the casing so as to form the outer wall thereof, it is not essential that the filter body be arranged in cylindrical form. If desired, the filtering body may be arranged in the form of a hollow prism 6 as illustrated in Figures 3 and 4 and provided with a top 7 closing the upper end of the casing.

When the device is in use, the air and gas enter the interior of the outer casing in a substantially tangential direction, thus forcing the gas and air into spiral courses substantially concentric with the periphery of the casing. Through this spiral or cyclonic action of the air and gas, a large portion of the dust is thrown out against the walls of the casing and allowed to settle into the dust hopper or the lower portion of the device.

Through this cyclonic action, the dust floating about in the central portion of the device is deprived of its energy and settles down into the dust hopper or the lower portion of the device. The balance of the dust contained in the air and gas is caught as the air and gas pass through the filtering body into the outlet chamber.

What I claim as new and desire to secure by Letters Patent is:

1. A dust separator, comprising an outer casing having a cylindrical separating chamber provided with an inlet opening for air and gases in one side thereof and unobstructed walls of the cylindrical chamber extending upwardly above the inlet, an inlet conduit for the air and gases connected with the exterior side of the casing and arranged so as to direct the air or gases passing through said inlet opening in a circular path and upwardly around the inner cylindrical walls of the casing, and a filter arranged in the unobstructed cylindrical chamber providing an outlet above said inlet through which the air or gases pass.

2. A dust separator, comprising an outer casing having a cylindrical separating chamber provided with an inlet opening for air and gases in one side thereof and unobstructed walls of the cylindrical chamber extending upwardly above the inlet, an inlet conduit for the air and gases connected with the exterior side of the casing and arranged so as to direct the air or gases passing therethrough in a circular path and upwardly around the inner cylindrical walls of the casing, and said casing having a cylindrical wall of filtering material arranged in the cylindrical casing as an upper extension thereof providing an outlet through which the air or gases pass on leaving the separating chamber.

3. A dust separator, comprising an outer casing having a cylindrical separating chamber provided with an inlet opening for air and gases in one side thereof and unobstructed walls of the cylindrical chamber extending upwardly above the inlet, an inlet conduit for the air and gases connected with the exterior side of the casing and arranged so as to direct the air or gases passing therethrough in a circular path and upwardly around the inner cylindrical walls of the casing, a filter arranged in the unobstructed cylindrical member providing an outlet above said inlet through which the air or gases pass, and a conical funnel wall arranged as an extension of the casing below said inlet conduit and having a dust discharge gate at its lower end.

4. A dust separator, comprising an outer casing having a cylindrical separating chamber having an inlet opening for air and gases in one side thereof and unobstructed walls of the cylindrical chamber extending upwardly to the outlet, an inlet conduit for the air and gases connected with the exterior side of said casing and arranged so as to direct the air or gases passing therethrough in a circular path and upwardly around the inner cylindrical walls of the casing to the outlet, said casing having a cylindrical wall of filtering material arranged in the outlet above said inlet and to form an upper extension of the casing and in direct unobstructed communication therewith through which filter the air or gases pass on leaving the separating chamber, and a funnel extension for the cylindrical casing below the inlet having a gate at its lower end through which dust may be removed.

5. A dust separator comprising an outer casing providing an inner cylindrical chamber and having air or gas inlet means for directing the air or gases in a circular unobstructed path upwardly around the inner cylindrical walls of the casing, said casing having a cylindrical wall of filtering material arranged above said inlet and to form an upper extension of the casing and in direct unobstructed communication therewith through which filter the air or gases pass on leaving the separating chamber, and a funnel extension for the cylindrical casing below the inlet having a gate at its lower end through which dust may be removed.

6. A dust separator, comprising an outer casing having a cylindrical separating chamber provided with unobstructed walls extending upwardly, an inlet conduit for the air and gases connected with the exterior side of the casing and arranged so as to direct the air or gases passing therethrough in a circular path and upwardly around the inner cylindrical walls of the casing, and a filter arranged above said cylindrical casing having vertical filtering walls providing an outlet through which the air or gases pass, with the inner surfaces of said filtering walls arranged in unobstructed relation with the cylindrical chamber whereby dust particles separated from the air or gas along said inner surface may fall directly into the chamber.

In testimony that I claim the foregoing as my invention, I have signed my name hereunder.

ANDERS JORDAHL.